United States Patent [19]
Doi et al.

[11] Patent Number: 4,490,820
[45] Date of Patent: Dec. 25, 1984

[54] RECEPTION SYSTEM FOR KEY TELEPHONE SYSTEM

[75] Inventors: Akiho Doi; Norio Saneyoshi, both of Tokyo, Japan

[73] Assignee: Iwasaki Tsushinki Kabushiki Kaisha, Tokyo, Japan

[21] Appl. No.: 403,315

[22] Filed: Jul. 30, 1982

[30] Foreign Application Priority Data

Aug. 3, 1981 [JP] Japan .................. 56-120686

[51] Int. Cl.³ .............................. H04J 3/06
[52] U.S. Cl. .................... 370/100; 179/90 K
[58] Field of Search .......... 370/100; 375/106; 179/90 K

[56] References Cited

U.S. PATENT DOCUMENTS

| | | | |
|---|---|---|---|
| 3,699,261 | 10/1972 | Tomozawa | 370/100 |
| 4,076,964 | 2/1978 | Henrion et al. | 370/100 |
| 4,131,854 | 12/1978 | Schollmeier | 375/106 |
| 4,133,981 | 1/1979 | Kibler | 370/100 |
| 4,302,831 | 11/1981 | Zemanek | 370/100 |

Primary Examiner—Douglas W. Olms
Assistant Examiner—Wellington Chin
Attorney, Agent, or Firm—Robert E. Burns; Emmanuel J. Lobato; Bruce L. Adams

[57] ABSTRACT

A reception system for a key telephone system, in which a voice signal and a control signal having the form of a frequency shift signal are multiplexed in an intercom line for transmission. In accordance with the present invention, there is provided means for extending by a predetermined period of time the period of a first clock pulse at the time of a key service unit transfering from the transmitting state to the receiving state, so that the center of data transmitted may coincide with the readout timing for reception.

The means for extending is arranged so that it may apply a reset pulse to a reset terminal of a frequency divider of an oscillator for generating the lock pulses.

4 Claims, 5 Drawing Figures

4,490,820

RECEPTION SYSTEM FOR KEY TELEPHONE SYSTEM

BACKGROUND OF THE INVENTION

The present invention relates to a reception system for a key telephone system in which a voice signal and a control signal having the form of a frequency shift signal are multiplexed in an intercom line for transmission.

SUMMARY OF THE INVENTION

An object of the present invention is to provide a reception system for a key telephone system in which when the key service unit turns from a transmission state to a reception state, the timing of the shift clock pulses for transmission is adjusted by the delay time of the receiving circuit to retain the timing for data readout at the center of each control signal at all times, thereby permitting stable transmission and reception even if the transmission rate is high.

Furthermore, data of several bits at the head of the control signal of the key telephone set is fixed and, in a case where the leading bits cannot be read out at the lock-in time, the key service unit inserts the fixed data in the concerned position after reception and then performs reception processing, by which a PLL can be utilized.

BRIEF DESCRIPTION OF THE DRAWINGS

The present invention will be described in detail below in comparison with conventional art with reference to the accompanying drawings, in which.

DETAILED DESCRIPTION

Figure 1:
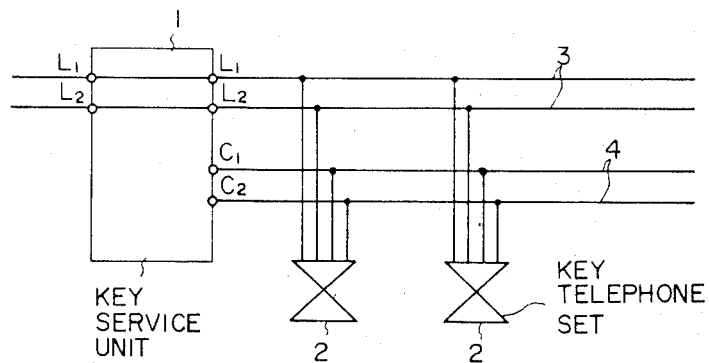
FIG. 1 is a connection diagram illustrating a key telephone system to which the present invention is applied.

For ready understanding of the present invention, a key telephone system of the type to which the present invention is applied will first be described. With reference to FIG. 1, reference numeral 1 indicates a key service unit; and 2 designates key telephone sets. The key service unit 1 and each key telephone set 2, and one and others of the key telephone sets 2 are interconnected via CO lines 3 and intercom lines 4. The CO line 3 is independently connected via the key service unit 1 to the respective key telephone sets 2. The intercom line 4 multiplexes speech signals, calling signals, control signals and a power source current, etc., and they are connected via the key service unit 1 to the respective key telephone sets 2. The control signal of time-division data train is transmitted in the form of an FS signal.

Figure 2:
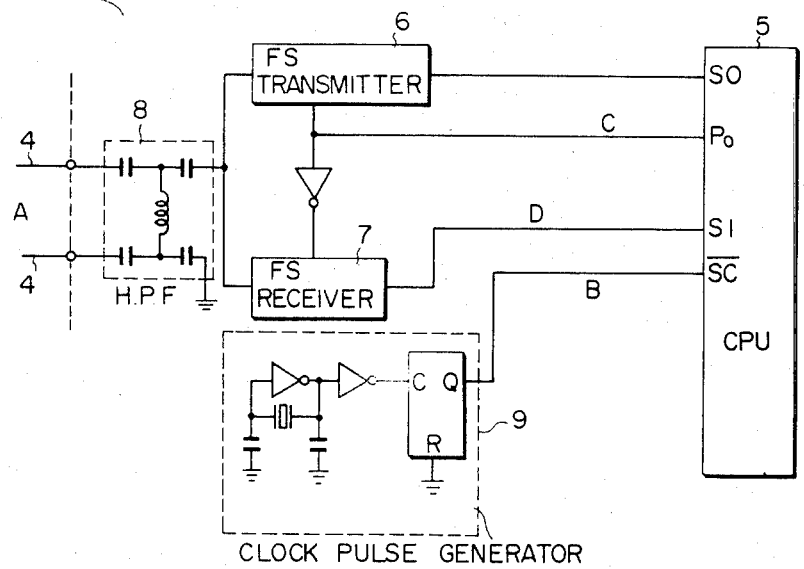
FIG. 2 is a circuit diagram including a block showing an example of a known reception system for a key telephone system.

FIG. 2 shows an example of the arrangement of a transmission circuit which is usable in the key service unit of such a key telephone system in which the control signal is FS modulated and multiplexed with the voice signal. In FIG. 2, reference numeral 5 identifies a microcomputer (CPU), which has such terminals as follows: SO is a serial data output terminal, SI a serial data input terminal, $\overline{SC}$ a shift clock input terminal and $P_0$ a transmission/reception control output port. Reference numeral 6 denotes an FS transmitter for converting a digital serial data train for transmission into an FS signal; 7 represents an FS receiver for converting an FS signal for reception into a digital serial data train; 8 shows a high-pass filter for removing a voice signal; and 9 refers to a shift clock pulse pulse generator.

Figure 3:
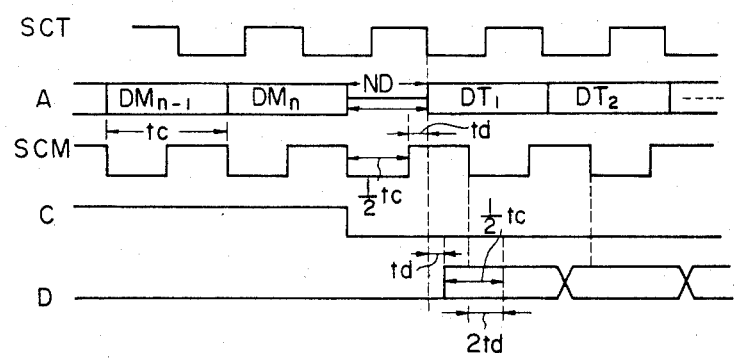
FIG. 3 shows timing charts explanatory of the operation of the prior art example of FIG. 2.

FIG. 3 shows timing charts related to the transmitting operation of the key service unit 1. Reference character SCT indicates shift clock pulse of the key telephone set, A an FS signal of the intercom line, SCM shift clock pulses of the key service unit 1 for transmission, C a transmission/reception control output, and D the FS receiver output.

A description will be given, with reference to FIG. 3, of the operation of the prior art example of FIG. 2 at the time of receiving a control signal from the key telephone set 2 after completing transmission. In order that the center of data transmitted from the key service unit 1 may coincide with the readout timing for reception in the key telephone set 2 in the state in which transmission timings of the key service unit 1 and the key telephone set 2 are synchronized with each other, the shift clock pulses SCT for transmission of the key telephone set is delayed from the shift clock pulses SCM of the key service unit 1 by $\frac{1}{2}t_c$ ($t_c$ = the period of the shift clock pulses) + $t_d$ (the response time of the receiving circuit). Upon completion of transmission of the key service unit 1, the transmission/reception control output of the microcomputer 5 of the key service unit 1 becomes ready for reception and receives a first bit of the control signal D from the key telephone set 2 at the next fall transition of the shift clock SCM. Since the transmission of the control signal of the key telephone set 2 is controlled by the shift clock pulses SCT for transmission of the key telephone set 2, however, it is the time of ($\frac{1}{2}t_c + t_d$) after completion of the transmission of the key service unit 1 when control signals $DT_1$, . . . occur in the intercom line 4. Furthermore, on account of the response time $t_d$ of the FS receiver 7 of the key service unit 1, the FS receiver 7 generates an output at the time of ($\frac{1}{2}t_c + 2t_d$) after completion of the transmission of the key service unit 1. In consequence, the timing at which the microcomputer 5 of the key service unit 1 receives the control signals $DT_1$, . . . from the key telephone set 2 deviates from the center of the data by $2t_d$. In a case where $\frac{1}{2}t_c \leq 2t_d$, reception of the control signals $DT_1$, . . . from the key telephone set 2 is impossible and, in order to satisfy a condition: $\frac{1}{2}t_c > 2t_d$, it is necessary to reduce the transmission rate or to use a receiver of reduced response time, incurring dangers of erroneous reception due to noise. Moreover, in a case where a phase lock loop (PLL) is employed in the FS receiver 7, there is a time period in which no carrier of any signal occurs in the FS signal A of the intercom line 4 between the control signals . . . $DM_{n-1}$, $DM_n$ from the key service unit 1 and the control signals $DT_1$, $DT_2$, . . . from the key telephone set 2 as indicated by ND and, in this while, the PLL is unlocked. Accordingly, for locking it again (lock-in time), there is usually caused a time lag far larger than the response time $t_d$; therefore, such a circuit as a PLL cannot be employed.

The present invention will hereinafter be described in detail.

Figure 4:
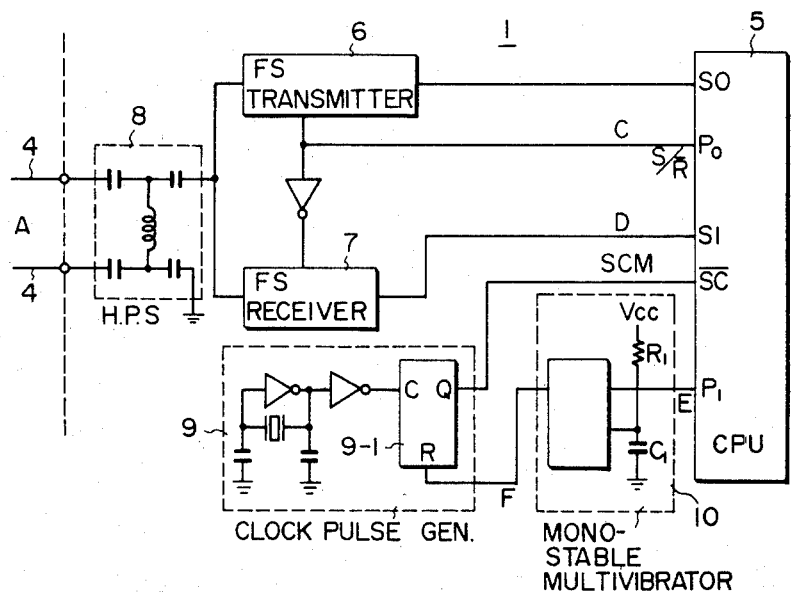
FIG. 4 is a circuit diagram including a block illustrating an embodiment of the present invention.

FIG. 4 illustrates a specific example of the transmission circuit of the key service unit 1. Reference numeral 5 indicates a microcomputer, SO being an output terminal for serial data for transmission, SI an input terminal for serial data for reception, $\overline{SC}$ an input terminal for shift clock pulses for transmission, $P_0$ a transmission/reception control output terminal, and $P_1$ an output terminal for shift clock reset pulses for transmission. Reference numeral 6 designates an FS transmitter for converting a digital serial data train for transmission into an FS signal; 7 identifies an FS receiver for converting an FS signal for reception into a digital serial data train; 8 denote a high-pass filter for eliminating a voice signal; 9 represents shift clock pulse generator for generating shift clock pulses for transmission; and 10 shows a monostable multivibrator for adjusting the timing of the shift clock pulses for transmission.

Figure 5:
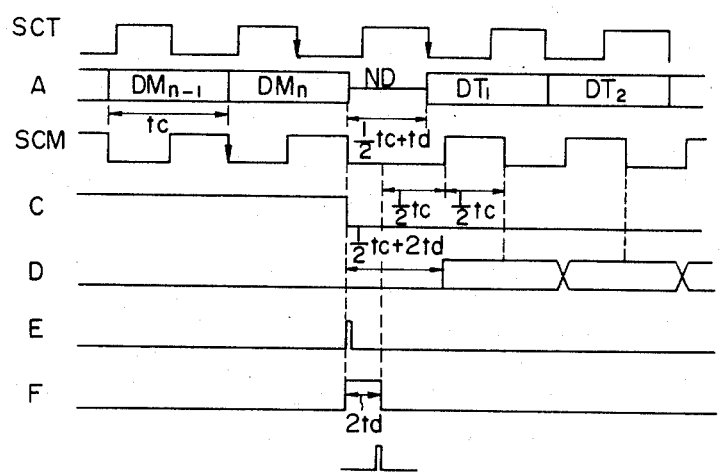
FIG. 5 shows timing charts explanatory of the operation of the embodiment of FIG. 5.

FIG. 5 shows timing charts of the transmission circuit of the key service unit 1, SCT showing a clock timing of the key telephone set, SCM shift clock pulses for transmission of the key service unit, C a transmission/reception control output, D the output from the FS receiver, E a shift clock reset output for transmission, and F the output from the monostable multivibrator. In the FS signal A, ... $DM_{n-1}$, $DM_n$ are control signals from the key service unit, $DT_1$, $DT_2$, ... are control signals from the key telephone set and ND is a period in which no carriers exist. A description will be given of the timing for the key service unit 1 to receive the control signal from the key telephone set 2 after completion of transmission. In a state in which the key service unit 1 and the key telephone set 2 perform transmission in synchronism with each other, the shift clock pulses SCT for transmission of the key telephone set 2 is delayed from the shift clock pulses SCM of the key service unit 1 by $\frac{1}{2}t_c$ ($t_c$=the period of the shift clock pulses)+$t_d$ ($t_d$=the response time of the receiving circuit) in order that the center of each control signal from the key service unit is caused to coincide with the readout timing of the key telephone set for reception. Upon completion of transmission from the key service unit 1, the transmission/reception control output C becomes ready for reception to make the transmitter 6 and the receiver 7 of the key service unit 1 ready for operation. At this time, the monostable multivibrator 10 is triggered by the shift clock reset output E from the microcomputer 5 to generate pulses of a pulse width ($2t_d$) dependent on the values of a resistor $R_1$ and a capacitor $C_1$. When the pulse F of the $2t_d$ width from the monostable multivibrator 10 is applied to a reset terminal R of a frequency divider 9-1 of the shift clock generator 9, the shift clock pulses SCM are interrupted for the period of the pulse width ($2t_d$) and then re-started. As a result of this, the shift clock pulses SCM lags by $2t_d$ and it is the time of ($t_c+2t_d$) after completion of the transmission when a fall transition of the shift clock pulses SCM occurs. Further, since the control signals $DT_1$, $DT_2$, ... of the key telephone set are transmitted in synchronism with the shift clock pulses SCT of the key telephone set, the head of the first bit is provided on the intercom line 4 at the time of ($\frac{1}{2}t_c+t_d$) after completion of transmission of the key service unit 1, and is applied via the high-pass filter 8 to the FS receiver 7, wherein it is further delayed by the response time $t_d$, providing a delay of ($\frac{1}{2}t_c+2t_d$) at the output of the FS receiver 7.

Since a fall transition of the shift clock pulses SCM occurs at a time of ($t_c+2t_d$) after completion of transmission and since this fall transition coincides with the readout timing for reception of first bits of the control signals $DT_1$, $DT_2$, ... from the key telephone set as described above, it follows that $$(t_c+2t_d)-(\tfrac{1}{2}t_c+2t_d)=\tfrac{1}{2}t_c.$$

Thus, the fall transitions of the shift clock pulses SCM always coincide with the center of each of the control signals $DT_1$, $DT_2$, ... from the key telephone set, so that the readout timing for reception of all control signals coincides with the center of each data.

In the case where the receiving circuit 7 is formed by such a circuit that the lock-in time after unlocking of the PLL by interruption of the carrier is far longer than the response time, the reception of the first bit of the control signal from the key telephone set is unstable even if the aforesaid system is employed.

As will be understood from the waveform A in FIG. 5, a carrier interruption period ND of ($\frac{1}{2}t_c+t_d$) occurs in the time interval between the end of transmission from the key service unit 1 and the occurrence of the control signal from the key telephone set. In the event that the FS receiver 7 is constituted by a PLL, the PLL is unlocked in the period ND, so that the output from the FS receiver 7 is generated ($\frac{1}{2}t_c+t_d+t_r$) (where $t_r$=the lock-in time of the PLL) after completion of transmission from the key service unit 1, and since $t_r>t_d$, the readout timing for reception deviates from the center of each control signal, resulting in the reception becoming unstable. To resolve this problem, fixed data are given to a first bit (or several bits) at the head of the control signal from the key telephone set and, after completion of reception of the control signal from the key telephone set, the microcomputer 5 of the key service unit 1 inputs the fixed data to the first bit (or several bits) and then performs post-reception processing, by which it is also possible to use such an FS receiver as a PLL.

In the foregoing, the monostable multivibrator is employed for determining the time for adjustment of the timing for the shift clock pulses SCM for transmission, but in a case where the response time is constant, it is also possible to adopt such an arrangement in which a timer is formed by a program and the reset terminal of the frequency divider 9-1 of the shift clock pulse generator 9 is directly controlled by the output E at the shift clock reset output terminal of the microcomputer 5, thereby to adjust the timing of the shift clock pulses for transmission.

As has been described in the foregoing, in accordance with the present invention, since the readout timing for reception can always be brought to the center of data by correcting the delay in the response time of the receiving circuit using the timing of the shift clock pulses, the invention has the following advantages: (1) the reception is stable; (2) high-speed transmission can be effected regardless of the response time of the receiving circuit; (3) this system is insusceptible to the influence of noise; and (4) a PLL can be used.

What we claim is:

1. In a key telephone system having a key service unit, a plurality of key telephone sets, intercom lines connecting the key telephone sets and the key service unit, a synchronization system in the key service unit for synchronizing transmissions between key telephone sets and the key service unit, the improvement for controlling transmission states of the key service unit and reception states thereof for receiving transmissions of control signals from the key telephone sets comprising, means for receiving from a corresponding key telephone set a serial data input including a start bit of a control signal and means for receiving a multiplex transmission having a multiplex voice signal and a frequency shift signal as said control signal, means for receiving the frequency shift signal and converting it into data input for synchronizing of the key service unit and the corresponding key telephone sets, means for removing from the multiplex transmission the voice signal before converting the frequency shift signal to said serial data input, means for detecting reception of the control signal, means for responding to said detection of the control signal and for extending by a period of time a period for effecting initiation of a period at termination of a state of transmission of the key service unit and start of a reception state for receiving transmissions from the corresponding key telephone sets to insure synchronization of the transmissions between the key service unit and the key telephone sets.

2. In a key telephone system having a key service unit, a plurality of key telephone sets, intercom lines connecting the key telephone sets and the key service unit, a synchronization system in the key service unit for synchronizing transmissions between the key telephone sets and the key service unit, the improvement for controlling the transmission states of the key service unit and reception states thereof for receiving transmissions from the key telephone sets comprising, means for receiving control signal transmissions having information content from a corresponding key telephone set, means for developing successive shift clock pulses each having an individual duration period for timing of alternate transmission states and reception states of the key service unit for receiving the control signal transmissions from the corresponding key telephone set, means for insuring fall of the trailing edge of the individual clock pulses coincides with the middle of the periods of the individual control signal transmissions during the periods of the reception states of the key service unit comprising means for delaying only each first shift clock pulse effective to start the individual periods of the reception states of the key service unit for a period effective to make the fall of the shift clock pulses coincide with the middle of the individual reception periods of the individual control signal transmissions from the corresponding key telephone set, whereby the middle of the read-out timing for reception of the individual said control signal transmissions from the corresponding key telephone set coincides with the middle of the information content transmitted from the corresponding key telephone set.

3. In a key telephone system according to claim 2, including timing means comprising a multivibrator for adjustment of timing of the shift clock pulses.

4. In a key telephone system according to claim 2, including timing means for adjustment of timing of the shift clock pulses comprises a microcomputer having a shift clock reset output, a shift clock pulse generator having a frequency divider to which said shift clock reset output is applied to adjust timing of the shift clock pulses.

* * * * *